2,984,641
POLYETHYLENE COMPOSITIONS CONTAINING TITANIUM ORGANIC COMPOUNDS AND STRUCTURES PRODUCED THEREFROM

Leon E. Wolinski, Buffalo, N.Y., assignor to E. I. du Pont de Nemours and Company, Wilmington, Del., a corporation of Delaware
No Drawing. Filed June 20, 1956, Ser. No. 592,499
10 Claims. (Cl. 260—41)

This invention relates to the manufacture of polyethylene structures and coatings. More particularly it relates to the preparation of polyethylene film suitable for conversion to bags, containers and similar packages.

One of the disadvantages of polyethylene film in the packaging field resides in its low adhesiveness to dried ink impressions, polymeric coatings, other substrates such as glass, wood, paper, and thermoplastic films other than polyethylene. The result is that any information imprinted on the surface of the polyethylene film such as instructions, advertising, trademarks or recipes are smeared or rubbed off by the normal abrasion suffered by the film during handling. This shortcoming has been substantially overcome by so-called printability treatments described in U.S. Patents 2,502,841; 2,632,921; 2,648,097; 2,668,134; 2,715,075; 2,715,076; 2,715,077 and several patent applications disclosed hereinafter. However, these treatments in turn have caused another problem. The ability of polyethylene to adhere to itself by the application of pressure and heat, i.e. heat-sealability, necessary in converting the film to packages, although satisfactory prior to the printability treatment, falls below satisfactory levels after treatment.

The object of the present invention is to provide a polyethylene structure, particularly film, having improved properties. Another object is to improve the heat-sealability of polyethylene structures without sacrificing the desirable properties of the polyethylene structures. Another object is to provide polyethylene structures and polyethylene coatings having a high level of adhesiveness to printing inks and the like, that can be easily heat-sealed. A more specific object is to provide a polyethylene composition, which when formed into a structure or used as a coating and subjected to a printability treatment, will provide a printable and heat-sealable structure. Other objects will appear hereinafter.

The objects are accomplished by a structure formed from a polyethylene resin having a weight average molecular weight of 15,000–3,000,000 (normally within the range from 200,000 to 1,500,000) and containing a small amount, i.e. at least about 0.1% and preferably not more than about 10% based on the weight of the polyethylene resin, of a titanium organic compound, the titanium organic compound having a softening temperature no greater than the lower temperature of the crystalline melting point range of the polyethylene resin, a normal boiling point above the optical melting point of the polyethylene resin, and a melt viscosity, at a temperature above 110° C., lower than that of the polyethylene resin. The process involves uniformly mixing the polyethylene resin with the titanium organic compound prior to forming the structure.

Although it is possible to define a melting point for the monomeric additives, the nature of the polymeric titanium organic compounds makes it possible only to specify a softening temperature rather than a melting point. Since softening temperatures is the more general term applying to both the monomeric and polymeric additives, it will be used throughout the specification. The softening temperature is determined by placing a chip of the additive on a highly polished copper block and raising the temperature of the block uniformly. The lowest temperature at which the additive sample leaves a molten trail when moved across the block by applying light pressure with a spatula is the softening temperature.

For polyethylene, a crystalline melting range is observed. This extends from a lower temperature at which crystallites begin to disappear to the so-called optical melting point at which crystallites are no longer detectable.

The preferred titanium organic compounds falling within the definition of the invention are hydrocarboxyl and acyl titanates having the structural formula:

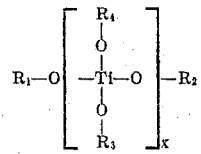

where $R_1$, $R_2$, $R_3$ and $R_4$ are selected from the group consisting of hydrogen, acyl of the formula

(where R' is alkyl), alkyl, cycloalkyl, aryl, alkaryl, aralkyl, lactyl and 1-methyl-3-oxo-1-butenyl, and $x$ is an integer from 1 through 100, provided that when $R_1$ is lactyl, $R_2$ is lactyl, $R_3$ and $R_4$ are hydrogen and $x$ equals 1 and that when $R_1$ is 1-methyl-3-oxo-1-butenyl, $R_2$ is 1-methyl-3-oxo-1-butenyl, $R_3$ and $R_4$ are hydrogen and $x$ equals 1.

When R ($R_1$, $R_2$, $R_3$, and $R_4$) is an alkyl, cycloalkyl, aryl, alkaryl or aralkyl group in the above formulation, the group usually contains from 1–20 carbon atoms. These structures may be illustrated by the simplified formulation $Ti(OR)_4$, and such compounds represented by this formulation may be called hydrocarbonyl titanates which include branched structures. When R is an acyl group

the R', which is alkyl, may range from 1–20 carbon atoms or greater.

On the other hand, the generic terms hydrocarbonyl titanates and the acyl titanates include branched and cyclic structures wherein the branching is in the titanium-oxygen chain, and where the cyclic structure is made up of titanium-oxygen segments. Such structures may be represented by the following generic formulae:

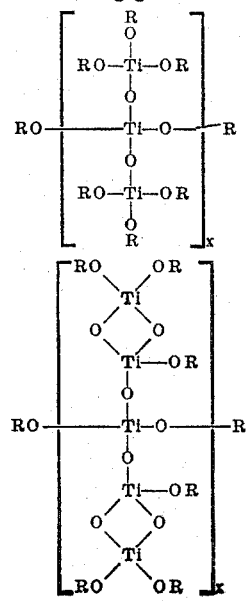

Various nomenclature have been applied to the compounds embraced by the terms acyl titanates. In U.S. Patent No. 2,621,195, J. H. Haslam refers to compounds within this terminology as titanium acylates or carboxylates and titanium ester-carboxylates. They are also referred to as polytitanyl carboxylates and ester-carboxylates. On the other hand various nomenclature have been applied to the compounds embraced by the terms hydrocarbonyl titanates. In U.S. Patent No. 2,621,195, J. H. Haslam refers to the compounds within this terminology as titanium esters or organic esters of ortho-titanic acid.

Specific examples of hydrocarbonyl titanates or the titanium esters (organic esters of orthotitanic acid) are illustrated by the following:

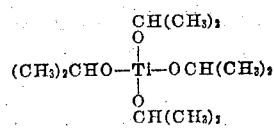

Tetraisopropyl titanate

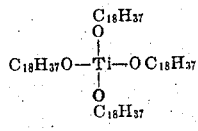

Tetrastearyl titanate

Other titanium esters include tetramethyl titanate, tetraethyl titanate, tetraisobutyl titanate, tetra-n-butyl titanate, tetra-2-ethylhexyl titanate, tetraamyl titanate, tetraoctyl titanate, tetradodecyl titanate, as well as tetracyclohexyl titanate, tetra-phenyl titanate, etc.

Specific compounds falling under the general class of acyl titanate (titanium acylates or carboxylates and titanium ester-carboxylates) are the following with corresponding structural formulae:

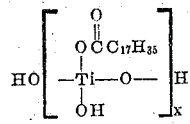

Hydroxy titanium stearate (a titanium acylate or carboxylate)

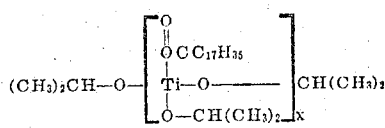

Isopropoxy titanium stearate (a titanium ester or carboxylate)

Other titanium acylates include hydroxy titanium oleate, isopropoxy titanium oleate, hydroxy titanium lactate, hydroxy titanium soy acylate, isopropoxy titanium soy acylate, hydroxy titanium linseed acylate, isopropoxy linseed acylate, hydroxy titanium castor acylate, hydroxy titanium tall oil acylate, isopropoxy titanium tall oil acylate, hydroxy titanium coconut acylate and isopropoxy titanium coconut acylate.

Titanium lactates [two lactyl groups and two hydrogens in Ti(OR)$_4$] and titanium acetylacetonates [two 1-methyl-3-oxo-1-butenyl groups and two hydrogen in Ti(OR)$_4$] are chelated compounds. There is actually some doubt about the structural formulation of the lactates of titanium, and these compounds may best be illustrated by the general formula:

$$Ti(OH)_2(C_3H_4O_2)_2$$

The chelated structures may take the following form for titanium lactate:

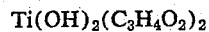

or

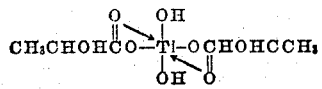

and for titanium acetylacetonate:

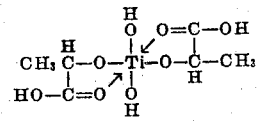

In the following table are listed the properties of some titanium organic compounds which fit the requirements of the present invention and were used in the subsequent examples.

| Compound | Softening Temperature [1] (° C.) | Normal Boiling Point [1] (° C.) |
|---|---|---|
| Tetra n-butyl titanate | below −40 | above 325. |
| Tetra isopropyl titanate | 20 | 232. |
| Tetrastearyl titanate | 64 | above 325. |
| Titanium lactate | below 100 | does not boil. |
| Titanium acetyl acetonate | do | Do. |
| Tetra-2-ethyl hexyl titanate | below −25 | Do. |
| Condensed butyl titanate (di n-butyl titanate) | below 25 | above 325. |
| Stearoxytitanium oleate | do | Do. |
| 2-ethylhexoxy titanium oleate | do | Do. |
| Hydroxytitanium stearate | below 100 | Do. |
| Isopropoxytitanium stearate | 68 | does not boil. |

[1] Softening temperatures and boiling points measured at 760 mm. of mercury are given unless otherwise specified.

As stated previously, the titanium organic additive must be blended uniformly into a polyethylene composition prior to extrusion and the quantity used will, of course, depend on the heat-sealability improvement desired. In general, 0.1%–10% based on the weight of the polyethylene resin will provide polyethylene structures displaying a marked improvement in heat-sealability as shown by high heat-seal strength. Furthermore, the polyethylene structures are more readily heat-sealed to form seals of substantial strength at lower heat-sealing temperatures than used heretofore.

The most important application of this invention is to polyethylene structures, particularly film, whose surface adhesion has been improved by so-called printability treatment. It is believed that this printability treatment "roughens" or modifies the surface of the polyethylene structure to create thereon microscopic "hills" not detectable by touch and not visible to the naked eye. A polyethylene film surface is considered to be satisfactorily roughened if the surface of the film contains substantially uniformly distributed "hills or mounds," each individual hill or mound having a diameter, as measured parallel to the film surface, of at least 0.05 micron to 1 micron, and usually between 0.05 micron to 0.5 micron. The elevation or height of these hills or mounds relative to the "flat" areas, i.e., areas which appear to be relatively untreated, is seldom greater than 0.2–0.5 micron, and usually not greater than 0.25 micron. As a general rule, the printability treatments do not carve out areas of the film surface to form depressions therein, but rather form hills or mounds having elevations relative to the untreated film surface. Besides improving printability (adhesion to printing inks), these treatments tend to improve the adhesive qualities of the surface of polyethylene structures in general. However, as mentioned previously, these treatments reduce the ability of polyethylene to adhere to itself when pressure and heat are applied.

For purposes of this invention, the adhesiveness of the surface of the polyethylene structure may be improved by any of a number of known expedients. These include superficial treatment of the polyethylene structure with chlorine gas described in U.S. Patent No. 2,502,481 to Henderson; treatment in a saturated solution of sodium dichromate in concentrated sulfuric acid, in U.S. Patent No. 2,668,134 to Horton. U.S. Patent No. 2,632,921 to Kreidl, discloses a process of subjecting the surface of the polyethylene structure to a temperature above about 60° C. while maintaining the underlying parts of the structure at a temperature below about 50° C. Similarly, U.S. Patent No. 2,648,097 to Kritchever discloses exposing the surface to a gas flame while the opposite surface is supported on a cool drum. Other techniques involve treating the surface with ozone while maintaining the structure at temperatures above 150° C.; that is, the molten structure immediately after extrusion (in the air gap) may be treated wih a gas containing ozone. This process is described and claimed in a copending application, U.S. Serial No. 323,271, filed November 29, 1952, by L. E. Wolinski. L. E. Wolinski has other patents and applications that involve treatment with ozone: U.S. Patent No. 2,715,075 relates to treatment in the presence of ozone and a halogen or hydrogen halide; U.S. Patent No. 2,715,076 relates to treatment with ozone in the presence of nitrous oxide; U.S. Serial No. 323,274, filed November 29, 1952, relates to treatment with ozone at a temperature of at least 150° C. followed by quenching the structure in an aqueous solution containing a halogen or halogen acid; and U.S. Serial No. 323,275, filed November 29, 1952, relates to treatment with ozone at a temperature of at least 150° C. followed by quenching the structure in a bath containing a conditioning agent such as hydrogen peroxide, nitrous acid, alkaline hypochlorites, concentrated nitric acid or mixtures of concentrated nitric acid and concentrated sulphuric acid. Treating the molten polyethylene structure, maintained at a temperature above 150° C., with nitrous oxide is described in U.S. Patent No. 2,715,077 to L. E. Wolinski. The adhesiveness of the surface of polyethylene may also be improved by quenching a freshly extruded film in an aqueous bath containing a halogen or a halogen acid as described in copending application U.S. Serial No. 347,391 filed April 7, 1953, by L. E. Wolinski. The polyethylene structure may be heated with a special conditioning agent such as hydrogen peroxide, concentrated nitric acid, nitrous acid, alkaline hypochlorites, or mixtures of concentrated nitric acid and concentrated sulphuric acid, as described in copending application U.S. Serial No. 487,701, filed February 11, 1955, by L. E. Wolinski. The use of high voltage stress accompanied by corona discharge, as disclosed in British Patent Nos. 715,914 and 722,875, may also be used. Surfaces of relatively high-density polyethylene structures may be made more adhesive by quenching a freshly formed structure at a temperature of at least 325° C. as described in U.S. Serial No. 506,660, filed May 6, 1955 by I. Swerlick.

Specific embodiments of the present invention are presented in the following examples. In all the examples, Bakelite DYNH-3 [1] polyethylene resin was used. This particular resin has its lower temperature of the crystalline melting point range at about 95° C., an optical melting point of 109° C., a density of about 0.92 gram/cc. and a weight average molecular weight of 750,000–1,000,000.

EXAMPLES 1–13

Various additives, as presented in Table I, were added to solid polyethylene resin flake. The mixture was melt blended in a Banbury mixer at a temperature between 180° C. and 200° C. to form a blend containing 0.2–1.0% of the additive, based on the weight of the polyethylene resin. The blend was then transferred to a rubber mill where milling occurred at a temperature of 145° C.–150° C. to form a sheet of the blended composition. The sheet was then chipped into flakes and fed into the extrusion apparatus.

The flakes were remelted in the extrusion apparatus

[1] Manufactured by Union Carbide and Carbon Corp.

and extruded at a temperature of 285° C. in the form of a film through an eight inch air gap, then led over a rotating chromium quench roll. The chrome quench roll was maintained at about 50° C. by passing water heated to this temperature through the interior of the roll.

During its passage through the air gap, the molten polyethylene film containing the additive underwent a printability treatment. The air gap was enclosed by a treating chamber. An ozone/oxygen mixture, containing about 0.4% ozone by volume, was passed through the chamber to contact one surface of the polyethylene film as described in U.S. Serial No. 323,271. The ozone/oxygen mixture passed through the chamber at a rate of 1.66 cu. ft./min. while the polyethylene film was led through the chamber at about 22 ft./min.

The properties of the resulting films, compared to a control film, are given in the following table. Heat-seal strength was measured in the following manner. The film samples were first cut into 6" squares. Squares from the same sample were then superimposed and sealed along one edge with a steel bar 3½" long and ⅛" wide at a temperature of 200° C. The seals were performed by using a dwell time of 0.15 second and a pressure of 10 lbs./sq. in. The heat-seals were made by sealing a surface that had undergone a printability treatment to a surface that had not, in a direction transverse to the direction in which the film was extruded. After heat-sealing, the connected squares were cut into strips 3" long and ½" wide. The free ends of the heat-seal strips were then pulled apart in a tensile testing apparatus at a rate of 100% per minute. The strength of the heat-seal, expressed in grams/inch of width, represents the highest force necessary to pull the strips apart.

Printability was determined by applying "Excelobrite" W-500, an ink manufactured by Bensing Brothers & Deeney, to the surface of the film by a commercial ink spreader. The spreader was composed of a steel rod having fine wires wrapped around it and produced a plurality of fine white lines on the surface of the film. The ink was dried by exposure for 3 minutes to a temperature of 60° C. After the ink cooled to room temperature, a strip of pressure-sensitive tape was applied to the film surface and pressed firmly. The strip was then pulled from the surface of the film and examined to determine whether any ink was removed. If ink were removed, the structure was classified as "non-printable."

*Table I*

EFFECT OF TITANIUM ORGANIC ADDITIVES ON HEAT-SEAL STRENGTH OF OZONE/OXYGEN-TREATED PRINTABLE POLYETHYLENE FILMS

| Example | Percent Additive | Heat-Seal Strength (grams/inch) |
|---|---|---|
| Control | None | 1,035 |
| 1 | 0.2% 2-ethylhexoxy titanium oleate | 1,205 |
| 2 | 0.4% 2-ethylhexoxy titanium oleate | 2,160 |
| 3 | 1.0% 2-ethylhexoxy titanium oleate | 1,473 |
| 4 | 0.4% Hydroxytitanium stearate | 1,750 |
| 5 | 1.0% Hydroxytitanium stearate | 1,400 |
| 6 | 0.4% Isopropoxytitanium stearate | 1,385 |
| 7 | 1.0% Isopropoxytitanium stearate | 1,445 |
| 8 | 0.4% Tetrastearyl titanate | 1,185 |
| 9 | 0.4% Tetra-2-ethyl hexyl titanate | 1,300 |
| 10 | 0.4% Condensed butyl titanate | 1,370 |
| 11 | 0.4% Tetraisopropyl titanate | 1,735 |
| 12 | 0.4% Titanium lactate | 1,795 |
| 13 | 0.4% Titanium acetyl acetonate | 1,735 |

EXAMPLES 14–30

Polyethylene films were prepared in the manner described for Examples 1–13 except for the concentration of ozone used in the printability treatment. About 1.2% by volume of ozone instead of 0.4% was used. The properties of the resulting films, compared to a control, are given in the following table.

*Table II*

EFFECT OF TITANIUM ORGANIC ADDITIVES ON HEAT-SEAL STRENGTH OF OZONE/OXYGEN-TREATED PRINTABLE POLYETHYLENE FILMS

| Example | Percent Additive | Heat-Seal Strength (grams/inch) |
|---|---|---|
| Control | None | 476 |
| 14 | 0.2% Tetra n-butyl titanate | 1,135 |
| 15 | 0.4% Tetra n-butyl titanate | 1,305 |
| 16 | 1.0% Tetra n-butyl titanate | 800 |
| 17 | 0.2% Condensed butyl titanate | 939 |
| 18 | 0.5% Condensed butyl titanate | 939 |
| 19 | 0.2% Tetra stearyl titanate | 784 |
| 20 | 0.5% Tetra stearyl titanate | 812 |
| 21 | 0.3% Tetra isopropyl titanate | 952 |
| 22 | 0.5% Tetra isopropyl titanate | 1,090 |
| 23 | 0.3% Tetra-2-ethylhexyl titanate | 1,305 |
| 24 | 0.5% Tetra-2-ethylhexyl titanate | 757 |
| 25 | 0.3% 2-ethyl hexoxytitanium oleate | 1,090 |
| 26 | 0.5% 2-ethyl hexoxytitanium oleate | 854 |
| 27 | 0.3% Titanium lactate | 799 |
| 28 | 0.5% Titanium lactate | 1,330 |
| 29 | 0.4% Stearoxytitanium oleate | 1,150 |
| 30 | 1.0% Stearoxytitanium oleate | 1,190 |

EXAMPLES 31–43

Polyethylene films were prepared in the manner described for Examples 1–13 except for the printability treatment. A mixture of ozone/oxygen/chlorine was used as described in U.S. Patent No. 2,715,075 instead of the ozone/oxygen treatment. The concentrations of ozone and chlorine in the mixture were each 0.4% by volume. The properties of the resulting films, compared to a control, are given in the following table.

*Table III*

EFFECT OF TITANIUM ORGANIC ADDITIVES ON HEAT-SEAL STRENGTH OF OZONE/OXYGEN/CHLORINE-TREATED PRINTABLE POLYETHYLENE FILMS

| Example | Percent Additive | Heat-Seal Strength (grams/inch) |
|---|---|---|
| Control | None | 965 |
| 31 | 0.2% 2-ethylhexoxy titanium oleate | 1,455 |
| 32 | 0.4% 2-ethylhexoxy titanium oleate | 1,430 |
| 33 | 1.0% 2-ethylhexoxy titanium oleate | 1,220 |
| 34 | 0.4% Hydroxytitanium stearate | 1,640 |
| 35 | 0.2% Isopropoxytitanium stearate | 1,345 |
| 36 | 0.4% Isopropoxytitanium stearate | 1,110 |
| 37 | 1.0% Isopropoxytitanium stearate | 1,150 |
| 38 | 0.4% Tetra-2-ethyl hexyl titanate | 1,120 |
| 39 | 0.4% Condensed butyl titanate | 1,370 |
| 40 | 0.2% Tetraisopropyl titanate | 1,260 |
| 41 | 0.4% Tetraisopropyl titanate | 1,790 |
| 42 | 0.4% Titanium lactate | 1,960 |
| 43 | 0.4% Titanium acetyl acetonate | 1,790 |

EXAMPLES 44–58

Polyethylene films were prepared in the manner described for Examples 1–13 except for the printability treatment. A mixture of ozone/oxygen/chlorine was used as described in U.S. Patent No. 2,715,075 instead of the ozone/oxygen treatment. The concentrations of ozone and chlorine in the mixture were respectively 1.2% and 0.8% by volume. The properties of the resulting films, compared to a control, are given in the following table.

*Table IV*

EFFECT OF TITANIUM ORGANIC ADDITIVES ON HEAT-SEAL STRENGTH OF OZONE/OXYGEN/CHLORINE-TREATED PRINTABLE POLYETHYLENE FILMS

| Example | Percent Additive | Heat-Seal Strength (grams/inch) |
|---|---|---|
| Control | None | 238 |
| 44 | 0.2% Tetra n-butyl titanate | 630 |
| 45 | 0.4% Tetra n-butyl titanate | 379 |
| 46 | 0.2% Condensed butyl titanate | 601 |
| 47 | 0.5% Condensed butyl titanate | 671 |
| 48 | 0.2% Tetra stearyl titanate | 783 |
| 49 | 0.5% Tetra stearyl titanate | 924 |
| 50 | 0.3% Tetra isopropyl titanate | 758 |
| 51 | 0.5% Tetra isopropyl titanate | 547 |
| 52 | 0.3% Tetra-2-ethylhexyl titanate | 700 |
| 53 | 0.3% 2-ethyl hexoxytitanium oleate | 532 |
| 54 | 0.5% 2-ethyl hexoxytitanium oleate | 364 |
| 55 | 0.3% Titanium lactate | 1,150 |
| 56 | 0.5% Titanium lactate | 1,175 |
| 57 | 0.4% Stearoxytitanium oleate | 910 |
| 58 | 1.0% Stearoxytitanium oleate | 868 |

EXAMPLES 59–60

Blends of polyethylene resin and the titanium organic additives were prepared and melt extruded in the form of a film through the air gap then over a rotating chromium quench roll as in Examples 1–13. However, the ozone/oxygen treatment was omitted. Instead the film was treated at a speed of 100 ft./min. with a propane/air flame at a flame temperature of about 1900° C., the burner being about 3/32" from the surface of the film. The top surface of the film attained a temperature over 200° C. while the under surface passed over the chromium roll maintained at 2° C. The details of this printability treatment are given in U.S. Patent No. 2,648,097.

The properties of the resulting printable films, compared to a control film that contained no additive but received the flame treatment, are given in the following table. The heat-seal strengths were measured by sealing a treated surface to a treated surface, the seals being made in the direction in which the film was extruded at the temperature shown in the table. The seals were pulled in the direction transverse to that of extrusion. In all other details heat-seal strength was measured substantially as disclosed previously.

*Table V*

EFFECT OF TITANIUM ORGANIC ADDITIVES ON HEAT-SEAL STRENGTH OF FLAME-TREATED PRINTABLE POLYETHYLENE FILMS

| Example | Percent Additive | Heat-Seal Strength (grams/inch) Using Various Sealing Temperatures | |
|---|---|---|---|
| | | 160° C. | 200° C. |
| Control | None | 38 | 380 |
| 59 | 0.5% Titanium lactate | 550 | 1,094 |
| 60 | 0.4% Tetra n-butyl titanate | 486 | 1,234 |

EXAMPLES 61–62

Blends of polyethylene resin and the additives were prepared and melt extruded in the form of films through the air gap then over a chromium quench roll at 60° C. as in Examples 1–13. However, the zone/oxygen treatment was omitted. Instead, the film was fed onto a grounded steel drum rotating at a circumferential speed of 35 ft./minute. A Tesla coil was held 1/8" above the drum and discharged 30,000 volts across the width of the polyethylene film in a manner similar to that described in British Patent No. 715,914.

The properties of the resulting printable films, compared to a control film that contained no additive but received the electrical discharge treatment, are given in the following table. Heat-seal strength was measured as in Examples 59–50.

*Table VI*

EFFECT OF TITANIUM ORGANIC ADDITIVES ON HEAT-SEAL STRENGTH OF VOLTAGE-TREATED PRINTABLE POLYETHYLENE FILMS

| Example | Percent Additive | Heat-Seal Strength (grams/inch) Using Various Sealing Temperatures | |
|---|---|---|---|
| | | 160° C. | 200° C. |
| Control | None | 425 | 925 |
| 61 | 0.5% Titanium lactate | 830 | 1,160 |
| 62 | 0.4% Tetra n-butyl titanate | 830 | 1,125 |

EXAMPLES 63–65

Polyethylene films containing titanium organic additives were prepared in the manner described for Examples 1–13 except that the ozone/oxygen treatment was omitted. In this example, the films did not undergo any printability treatment. The results, compared to a control wherein no additive was used, are given in the following table. The heat-seal strengths of two commercial polyethylene films (Products X and Y), containing no additives of the type disclosed herein, are also given for comparative purposes.

*Table VII*

EFFECT OF TITANIUM ORGANIC ADDITIVES ON HEAT-SEAL STRENGTH OF NON-PRINTABLE POLYETHYLENE FILMS

| Example | Percent Additive | Heat-Seal Strength (grams/inch) Using Various Sealing Temperatures | | |
|---|---|---|---|---|
| | | 120° C. | 145° C. | 160° C. |
| Control | None | No seal | | 300 |
| Product X | None | | 56 | |
| Product Y | None | | | 180 |
| 63 | 0.4% Tetra n-butyl titanate | 1,010 | | 1,188 |
| 64 | 0.5% Titanium lactate | 904 | | 1,114 |
| 65 | 1.0% Titanium lactate | 842 | | 1,014 |

As shown by the examples, the invention is not only useful in preparing heat-sealable, printable polyethylene packaging film, but is useful in improving the heat-seal strength of polyethylene film in general, and in lowering the temperature required for satisfactory heat-seals. In the case of printable polyethylene packaging films, the addition of the specified titanium organic compounds in accordance with the invention serves to recover the heat-seal strength lost by the polyethylene film due to the printability treatment. The use of these special additives also tends to retard the loss of printability of heat-sealability of the polyethylene film with age such as inevitably occurs during storage prior to printing and conversion of film to bags. Although the description has been restricted to the use of titanium organic compounds, zirconium organic compounds within the same definition as the titanium compounds will also operate for the purposes of the present invention.

Besides polyethylene film, the invention is applicable to other self-supporting structures such as filaments, rods, tubes, sheets for lamination and to supported polyethylene structures wherein polyethylene compositions containing the additives are coated on one or both sides of various base films such as cellophane, polyethylene terephthalate, polyvinylidene chloride, etc. It is applicable to polyethylene structures of normal density (0.91–0.93 gram/cc.) and to polyethylene structures of heavy density (0.94–0.96 gram/cc.); to polyethylene compositions formed by copolymerizing polyethylene with minor amounts of propylene, butylene, isobutylene, styrene, vinyl-acetate and similar vinyl compounds; to polymethylene derived from carbon monoxide and hydrogen as in U.S. Patent No. 2,652,372 to Farlow and Herrick; and to polypropylene, polybutylene and the like.

In forming polyethylene films containing the special additives, a melt extrusion process is usually employed. In general, a molding powder or flake of polyethylene along with the additive is fed continuously into a melt extrusion machine; the molten polyethylene is continuously extruded through a slot orifice, then through an air gap vertically downward into a quench bath or onto a quench roll maintained at a temperature from 25° C.–95° C., preferably from 30° C.–60° C. Usually, the polyethylene is extruded from a melt maintained at a temperature above 150° C. Tubing is usually extruded from a melt at a temperature within a range of 150° C.–200° C., whereas film is extruded at a temperature which may be anywhere from above 250° C. to the degradation temperature of the polyethylene. An alternate process of forming polyethylene film which also employs molten polyethylene comprises milling molten polymer on closely spaced calender rolls to form a film which is conducted vertically downward into a quench bath. In either of these general methods of forming polyethylene film, the space between the point where the molten film leaves the slot orifice or the last calender roll and the point where the molten film enters the quench bath is termed the "air gap." During passage through the air gap, the film is usually permitted to pass uninhibited through the atmosphere; and this provides for some superficial cooling. Generally, the length of the air gap ranges from 2" to as long as 15" in some cases. In some cases as illustrated in Examples 1–58, the film may be subjected to the printability treatment in the air gap. Besides forming polyethylene structures from the molten polymer, polyethylene structures may also be formed from solutions thereof in a solvent, or from dispersions of the polyethylene in an inert liquid medium such as water. Similarly, the polyethylene coatings may be applied upon other substrates from a melt, solvent solution or dispersion in a liquid medium.

The amount of additive required lies above about 0.1%, and very rarely above 10%. The precise amount will depend upon the increase in heat-seal strength desired. In cases where it is desired to recover the heat-seal strength lost by the printability treatment, the amount of additive will depend on the particular printability treatment and the extent of this treatment. In most cases, not more than about 5% of the additive need be incorporated in the polyethylene film to prevent the subsequent loss of heat-seal strength due to the printability treatment.

The following theory is offered to explain the surprising success of the present invention. However, this theory should not be construed as limiting the scope of the invention. It is believed that the additive when incorporated in the polyethylene composition is not completely compatible with the polyethylene resin. During the heat-sealing step, the additive tends to exude to the surface, thus plasticizing the surface of the polyethylene structure. Plasticization of the surface, in turn, serves to increase the heat-sealability of the structure.

As many widely different embodiments can be made without departing from the spirit and scope of this invention, this invention is not limited except as defined in the appended claims.

What is claimed is:

1. A composition of matter comprising a polyethylene resin having a weight average molecular weight of 15,000 to 3,000,000 and 0.1%–10%, based on the weight of said resin, of at least one titanium organic compound represented by the structural formula:

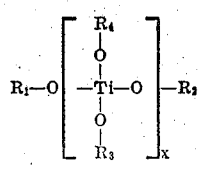

where $R_1$, $R_2$, $R_3$ and $R_4$ are selected from the group consisting of hydrogen, acyl of the formula

(where $R'$ is alkyl), alkyl, cycloalkyl, aryl, alkaryl, aralkyl, lactyl and 1-methyl-3-oxo-1-butenyl, and $x$ is an integer from 1 through 100, provided that when $R_1$ is lactyl, $R_2$ is lactyl, $R_3$ and $R_4$ are hydrogen and $x$ equals 1 and that when $R_1$ is 1-methyl-3-oxo-1-butenyl, $R_2$ is 1-methyl-3-oxo-1-butenyl, $R_3$ and $R_4$ are hydrogen and $x$ equals 1, said titanium organic compound having a softening temperature no greater than the lower temperature of the crystalline melting range of said resin, a normal boiling point above the optical melting point of said resin and a melt viscosity lower than that of said resin at a temperature above 110° C.

2. A composition of matter as in claim 1 wherein the titanium organic compound is tetra n-butyl titanate.

3. A composition of matter as in claim 1 wherein the titanium organic compound is tetra isopropyl titanate.

4. A composition of matter as in claim 1 wherein the titanium organic compound is tetrastearyl titanate.

5. A composition of matter as in claim 1 wherein the titanium organic compound is titanium lactate.

6. A composition of matter as in claim 1 wherein the titanium organic compound is titanium acetyl acetonate.

7. A composition of matter comprising a polyethylene resin having a weight average molecular weight of 200,000 to 1,500,000 and 0.1%–10%, based on the weight of said resin, of at least one titanium organic compound represented by the structural formula:

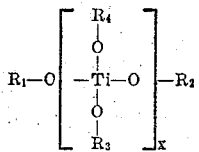

where $R_1$, $R_2$, $R_3$ and $R_4$ are selected from the group consisting of hydrogen, acyl of the formula

(where $R'$ is alkyl), alkyl, cycloalkyl, aryl, alkaryl, aralkyl, lactyl and 1-methyl-3-oxo-1-butenyl, and $x$ is an integer from 1 through 100, provided that when $R_1$ is lactyl, $R_2$ is lactyl, $R_3$ and $R_4$ are hydrogen and $x$ equals 1 and that when $R_1$ is 1-methyl-3-oxo-1-butenyl, $R_2$ is 1-methyl-3-oxo-1-butenyl, $R_3$ and $R_4$ are hydrogen and $x$ equals 1, said titanium organic compound having a softening temperature no greater than the lower temperature of the crystalline melting range of said resin, a normal boiling point above the optical melting point of said resin and a melt viscosity lower than that of said resin at a temperature above 110° C.

8. A packaging firm comprising a polyethylene resin having a weight average molecular weight of 15,000 to 3,000,000 and 0.1%–10%, based on the weight of said resin, of at least one titanium organic compound represented by the structural formula:

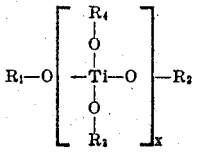

where $R_1$, $R_2$, $R_3$ and $R_4$ are selected from the group consisting of hydrogen, acyl of the formula

(where $R'$ is alkyl), alkyl, cycloalkyl, aryl, alkaryl, aralkyl, lactyl and 1-methyl-3-oxo-1-butenyl, and $x$ is an integer from 1 through 100, provided that when $R_1$ is lactyl, $R_2$ is lactyl, $R_3$ and $R_4$ are hydrogen and $x$ equals 1 and that when $R_1$ is 1-methyl-3-oxo-1-butenyl, $R_2$ is 1-methyl-3-oxo-1-butenyl, $R_3$ and $R_4$ are hydrogen and $x$ equals 1, said titanium organic compound having a softening temperature no greater than the lower temperature of the crystalline melting range of said resin, an average normal boiling temperature above the optical melting point of said resin and a melt viscosity lower than that of said resin at a temperature above 110° C.

9. A packaging film comprising a polyethylene resin having a weight average molecular weight between 200,000 and 1,500,000 and 0.1%–10%, based on the weight of said resin, of at least one titanium organic compound represented by the structural formula:

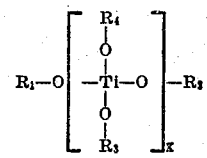

where $R_1$, $R_2$, $R_3$ and $R_4$ are selected from the group consisting of hydrogen, acyl of the formula

(where $R'$ is alkyl), alkyl, cycloalkyl, aryl, alkaryl, aralkyl, lactyl and 1-methyl-3-oxo-1-butenyl, and $x$ is an integer from 1 through 100, provided that when $R_1$ is lactyl, $R_2$ is lactyl, $R_3$ and $R_4$ are hydrogen and $x$ equals 1 and that when $R_1$ is 1-methyl-3-oxo-1-butenyl, $R_2$ is 1-methyl-3-oxo-1-butenyl, $R_3$ and $R_4$ are hydrogen and $x$ equals 1, said titanium organic compound having a softening temperature no greater than the lower temperature of the crystalline melting range of said resin, an average normal boiling temperature above the optical melting point of said resin and a melt viscosity lower than that of said polyethylene resin at a temperature above 110° C.

10. Self-supporting structures and coatings comprising a polyethylene component having a weight average molecular weight of 15,000 to 3,000,000 and 0.1%–10%, based on the weight of said polyethylene component, of at least one titanium organic compound represented by the structural formula:

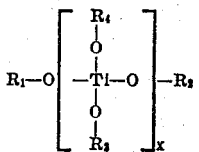

where $R_1$, $R_2$, $R_3$, and $R_4$ are selected from the group consisting of hydrogen, acyl of the formula

(where $R'$ is alkyl), alkyl, cycloalkyl, aryl, alkaryl, aralkyl, lactyl and 1-methyl-3-oxo-1-butenyl, and $x$ is an integer from 1 through 100, provided that when $R_1$ is lactyl, $R_2$ is lactyl, $R_3$ and $R_4$ are hydrogen and $x$ equals 1 and that when $R_1$ is 1-methyl-3-oxo-1-butenyl, $R_2$ is 1-methyl-3-oxo-1-butenyl, $R_3$ and $R_4$ are hydrogen and $x$ equals 1, said titanium organic compound having a softening temperature no greater than the lower temperature of the crystalline melting range of said polyethylene component, an average normal boiling temperature above the optical melting point of said polyethylene component and a melt viscosity lower than that of said polyethylene componnet at a temperature above 110° C.

References Cited in the file of this patent

UNITED STATES PATENTS

| | | |
|---|---|---|
| 2,405,977 | Peters | Aug. 20, 1946 |
| 2,461,975 | Fuller | Feb. 15, 1949 |
| 2,531,408 | D'Alelio | Nov. 28, 1950 |
| 2,549,940 | Signaigo | Apr. 24, 1951 |
| 2,700,027 | Bruson | Jan. 18, 1955 |
| 2,824,090 | Edwards et al. | Feb. 18, 1958 |
| 2,845,412 | Heyson | July 29, 1958 |
| 2,862,917 | Anderson et al. | Dec. 2, 1958 |

OTHER REFERENCES

"Titanium Organics Show Promise," Chem. Eng. News, volume 33, pages 4226 and 4228, October 1955.